United States Patent
Mayberry et al.

[15] 3,668,701
[45] June 6, 1972

[54] MONITORING APPARATUS

[72] Inventors: Billy T. Mayberry, Scottsdale; Edwin B. Sirrine, Phoenix, both of Ariz.

[73] Assignee: Sperry Rand Corporation

[22] Filed: Aug. 20, 1970

[21] Appl. No.: 65,573

[52] U.S. Cl. ............................. 340/409, 340/181, 340/199, 340/214
[51] Int. Cl. .................................................. G08b 19/00
[58] Field of Search ............... 340/409, 181, 198, 199, 410, 340/214, 248 A, 248 E, 248 R

[56] References Cited

UNITED STATES PATENTS

| | | | |
|---|---|---|---|
| 3,100,889 | 8/1963 | Cannon | 340/199 |
| 3,482,231 | 12/1969 | Florek et al. | 340/198 |
| 3,354,399 | 11/1967 | Houpt et al. | 340/181 |
| 3,454,787 | 7/1969 | Gelernter | 340/248 A |
| 3,492,589 | 1/1970 | Rotier | 340/248 A |

Primary Examiner—David L. Trafton
Attorney—S. C. Yeaton

[57] ABSTRACT

A monitoring circuit monitors separate transducers energized by an alternating current carrier for determining if a failure to track occurs and for detecting failure of components of the monitoring circuit. The amplitude and phase of the transducer outputs and a.c. and d.c. tracer signals normally combine to produce a tracking-within-tolerance signal. The transducers are individually monitored for carrier output indicative of their operativeness. A pair of relay driver amplifiers responsive to the tracking signal and each carrier signal are normally alternately energized to maintain relays in a normally energized condition. Tracking failure or failure of any component in the monitoring circuitry causes disruption of the alternate energization of the relay driver amplifiers causing one or more relays to deenergize and actuate an alarm. A test sequence provides for a system check by progressively short circuiting portions of a tracking monitoring input circuit to produce an alarm signal followed by an alarm off condition.

9 Claims, 9 Drawing Figures

INVENTORS
BILLY T. MAYBERRY
EDWIN B. SIRRINE
BY
*H P Terry*
ATTORNEY

INVENTORS.
BILLY T. MAYBERRY
EDWIN B. SIRRINE
BY

ATTORNEY

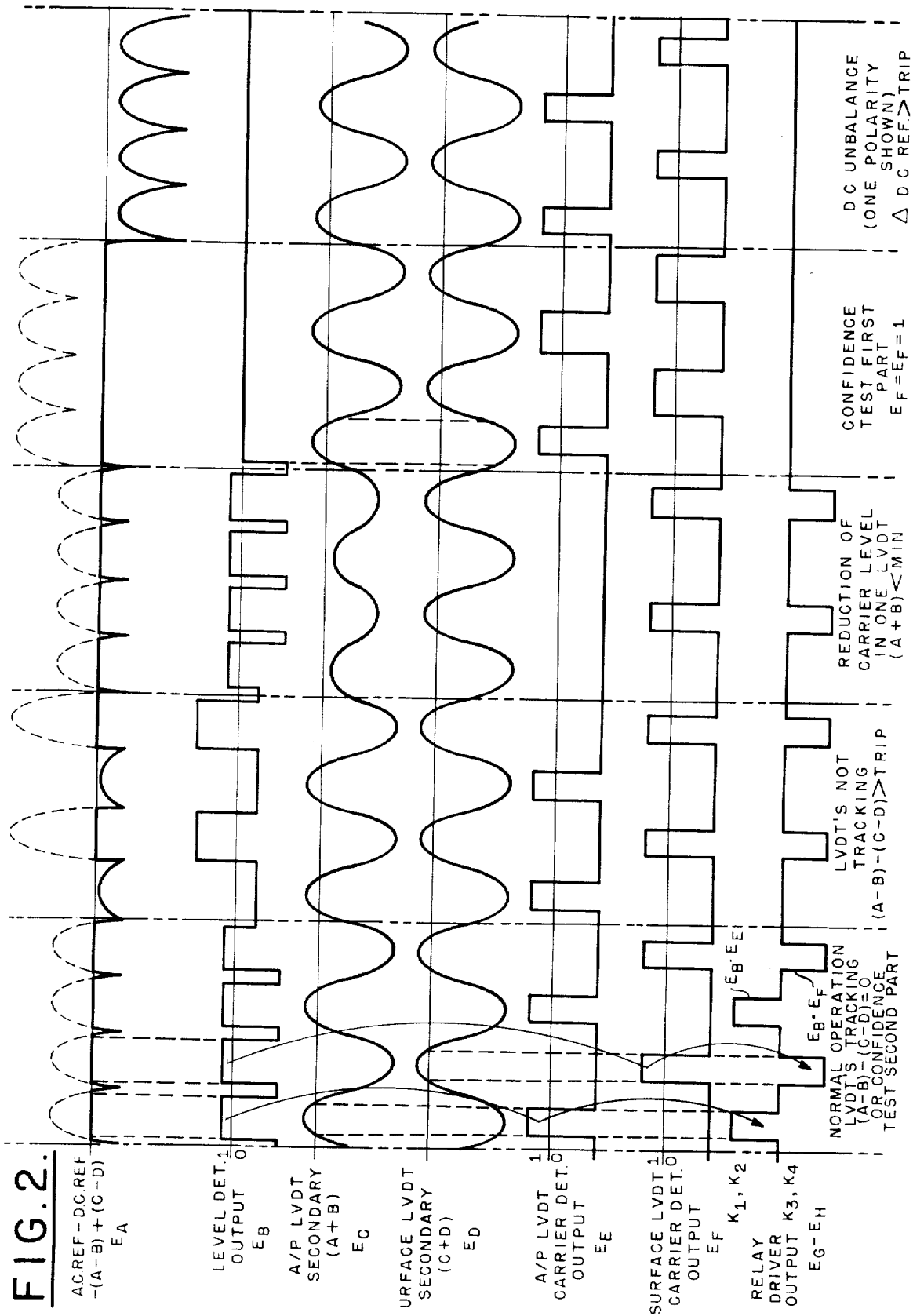

INVENTORS
BILLY T. MAYBERRY
EDWIN B. SIRRINE
BY
*HP Terry*
ATTORNEY

INVENTORS
BILLY T. MAYBERRY
EDWIN B. SIRRINE
BY
*HP Terry*
ATTORNEY

MONITORING APPARATUS

BACKGROUND OF THE INVENTION

1. Field of the Invention

The present invention pertains to monitoring circuits and is particularly suitable for use in aircraft autopilot monitoring.

2. Description of the Prior Art

Prior art monitors are known which comprise a plurality of interconnected binary circuits that may exist either in on or off states. The logical interconnections of these circuits is arranged such that a warning signal is provided by the monitor in response to abnormal operation of the devices monitored and a no-warning signal is provided in response to normal operation thereof. These prior art monitors suffer from the disadvantage that should a component circuit of the monitor fail so that the monitor output provides the no-warning signal irrespective of the states of the devices monitored, failure of the devices monitored may occur without an indication thereof. Under these circumstances the monitor is rendered inoperative and unable to perform the necessary function for which it was designed.

SUMMARY OF THE INVENTION

The present invention obviates the disadvantage of the prior art monitors by maintaining the majority of the monitor circuit components in a dynamic state. Failure of a component to either an ON or an OFF condition results in a warning output. This result is achieved by a monitor that includes a source of alternating reference potential. The apparatus also includes level detecting means for providing an alternating signal in response to the signal obtained by combining the alternating reference potential and the signals being monitored. Alternating means coupled to the level detecting means for being alternately energized in response to the alternating signal whenever the monitored signals are within a predetermined tolerance of one another and the monitoring apparatus is functioning properly are also included. Output means coupled to the alternating means are included for being maintained in an energized condition in response to the alternating means being alternately energized and providing a warning signal when becoming deenergized.

BRIEF DESCRIPTION OF THE DRAWINGS

FIG. 2 is a waveform diagram showing waveforms useful in understanding the operation of the circuit of FIG. 1.

DESCRIPTION OF THE PREFERRED EMBODIMENT

Figure 1A:
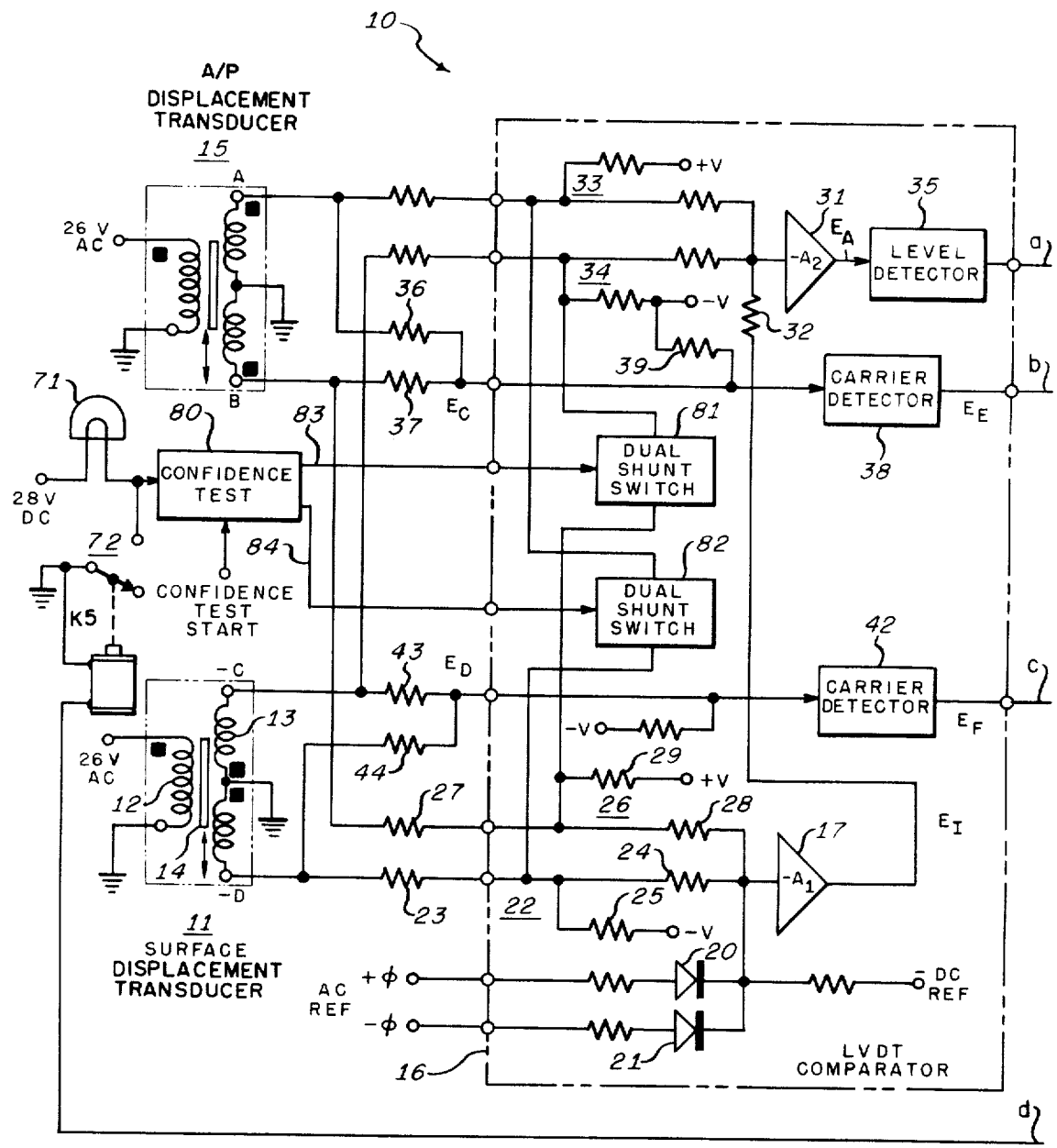
FIG. 1 consists of FIGS. 1a and 1b showing a schematic circuit diagram partially in block form illustrating a preferred embodiment of the present invention.
Figure 1B:
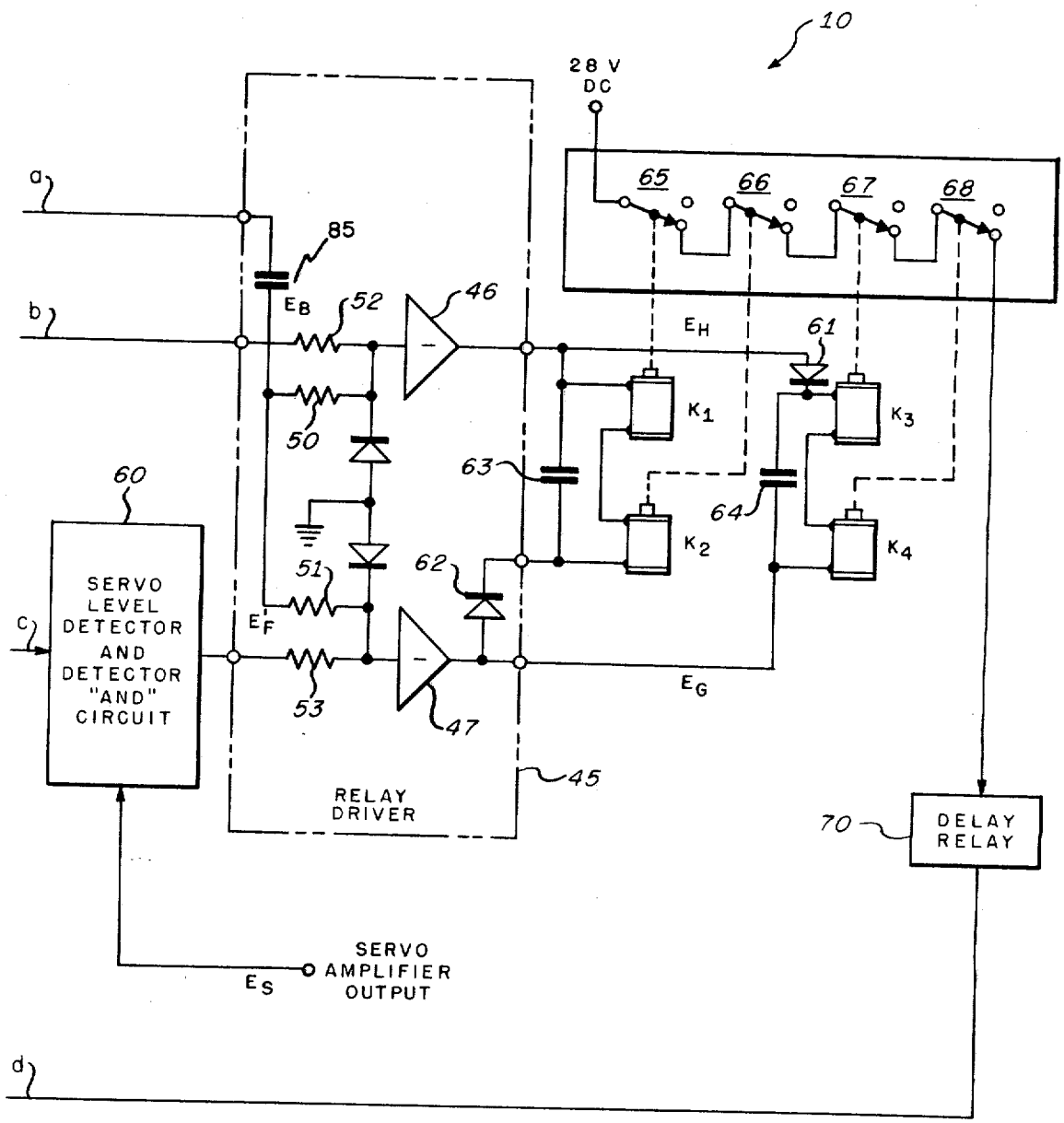

Referring to FIG. 1, a monitor 10 embodying the principles of the present invention is illustrated. For purposes of description, the monitor 10 will be explained in terms of providing a warning signal whenever the magnitudes of the signals from two transducers are different from one another in excess of a predetermined tolerance. A warning signal is also provided should a transducer or any component of the monitor circuit fail. The transducers may, for example, be inductive displacement pickoffs of the linear differential variable transformer type commonly utilized in modern jet transports. The term "linear variable differential transformer" will hereinafter be referred to as LVDT for convenience.

A LVDT 11 may be coupled to a control surface of the aircraft to provide a signal representative of the displacement of the surface. The LVDT 11 comprises a primary winding 12 coupled to receive an a.c. potential from the aircraft electrical system. The primary winding 12 is inductively coupled to center tapped secondary windings 13 via a moveable core 14. The core 14 is coupled to the aircraft control surface so that the signal from the secondary windings 13 are representative of the surface displacement.

A second LVDT 15 may, for example, be coupled to the control valve of the hydraulic servo utilized to drive the surface to which the LVDT 11 is coupled. Hence, during normal operation the signals from the LVDT's 11 and 15 should track one another. The monitor 10 provides a warning signal whenever the LVDT's fail to track one another within a predetermined tolerance.

Figure 3:
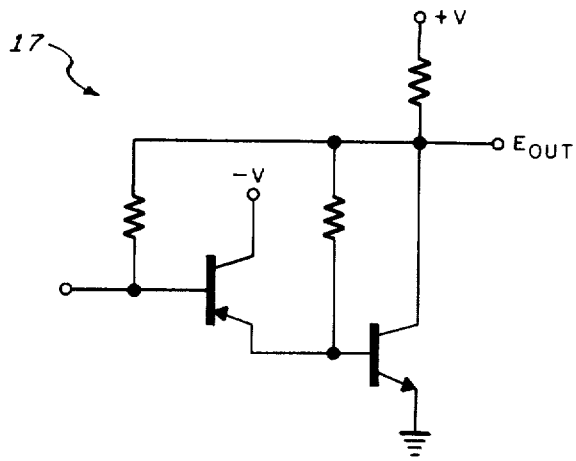
FIGS. 3 through 8 are schematic diagrams showing circuit details of the blocks of FIG. 1.

The signals from the LVDT's 11 and 15 are applied as inputs to a LVDT comparator circuit 16. The comparator circuit 16 includes a single-ended d.c. amplifier 17. The amplifier 17 may be configured in accordance with the circuit shown in FIG. 3. The amplifier circuit of FIG. 3 is designed so that the only type of amplifier failure that may occur must be of the catastrophic type, that is, a failure that totally disrupts the circuit operation.

The amplifier 17 receives as an input signal a full wave rectified a.c. signal via diodes 20 and 21. A d.c. reference potential is combined with the a.c. reference at the amplifier input. The D output of the transducer 11 is applied via a resistance T-network 22 to the input of the amplifier 17. The T-network 22 comprises resistors 23, 24 and 25, the shunt resistor 25 being connected to a source of potential (−V).

The B output of the transducer 15 is applied via a resistor T-network 26 to the input of the amplifier 17. The T-network 26 comprises resistors 27, 28 and 29. The shunt resistor 29 is connected to a source of potential (+V). The sources of potential −V and +V connected to the T-networks 22 and 26 respectively serve as d.c. tracers in a manner to be explained.

It is now appreciated that the amplifier 17 provides the sum of the voltages appearing at the B and D outputs of the LVDTs 15 and 11 respectively, the tracer voltages +V and −V, and the a.c. and d.c. reference potentials previously described.

The output of the amplifier 17 is applied as an input to an amplifier 31 via a summing resistor 32. The amplifier circuit 31 is identical to that described with respect to the amplifier 17. The A and C outputs of the LVDT's 15 and 11 respectively are summed into the input of the amplifier 31 via T-networks 33 and 34 respectively in a manner similar to that described with respect to the inputs to the amplifier 17. The output signal of the amplifier 31 is designated as $E_A$ and is illustrated in FIG. 2.

Figure 4:
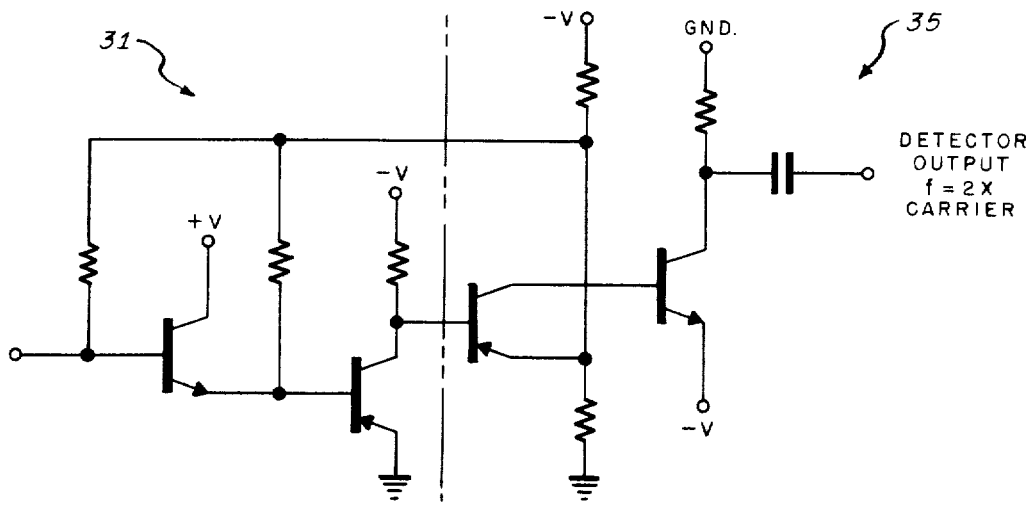

The output of the amplifier 31 is applied as an input to a level detector 35. The level detector 35 is a threshold sensitive amplifier with essentially infinite gain. Thus output $E_B$ of the detector 35 is a rectangular pulse of twice the frequency of the a.c. reference where the switching points of the amplifier occur when $E_A$ passes the threshold of the detector 35. The output $E_B$ of the detector 35 is illustrated in FIG. 2. The circuits of the amplifier 31 and the detector 35 are illustrated in FIG. 4. The circuits of FIG. 4 are designed so that only catastrophic failures may occur in a manner similar to that explained with respect to FIG. 3.

It will now be appreciated that the sum of the d.c. tracers connected to the T-networks 22, 26, 33 and 34 is zero at the input to the detector 35. An open or a short in any component of the T-networks, including an input lead opening, will shift the d.c. reference out of the range of the detector 35 providing a warning signal in a manner to be explained. A warning signal will also be provided due to the failure of any transistor or resistor in the signal path.

The A and B outputs of the LVDT 15 are connected via resistors 36 and 37, respectively, to the input of a carrier detector 38. The input to the carrier detector 38 is returned to a negative reference potential (−V) via a resistor 39 which establishes the detection level of the circuit 38. In a manner similar to that described with respect to the detector 35, any open or short in the input circuits to the carrier detector 38 will shift the d.c. reference out of the range thereof providing a warning signal in a manner to be described.

Figure 5:
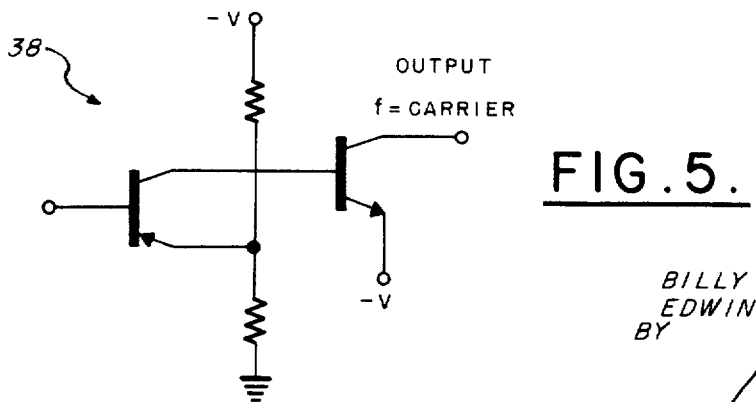

The carrier detector 38 senses the peak amplitude of the positive half cycles of the sum of both secondaries of the LVDT 15. As the carrier sine wave exceeds the detection level, the output of the detector 38 changes from a logical ZERO to a series of pulses. The input to the carrier detector 38 is designated as $E_C$ and the output thereof is designated as $E_E$, which waveforms are illustrated in FIG. 2. The carrier detector 38 may be configured in accordance with the circuit illustrated in FIG. 5 which circuit exhibits catastrophic failure properties similar to those described with respect to FIG. 3.

The C and D outputs of the LVDT 11 are applied to a carrier detector 42 via resistors 43 and 44 respectively in a manner identical to that described with respect to the carrier detector 38 and the LVDT 15. The input and output waveforms $E_D$ and $E_F$ are graphically illustrated in FIG. 2.

It should be noted that the signals $E_C$ and $E_D$ from the LVDT's 15 and 11 respectively are normally 180° out of phase with respect to each other. Hence the output pulses from the carrier detectors 38 and 42 respectively are shifted relative to each other as illustrated in FIG. 2. It will be appreciated that a ONE or ZERO failure of either the pulses $E_E$ or $E_F$ results in a warning signal in a manner to be explained.

Figure 6:
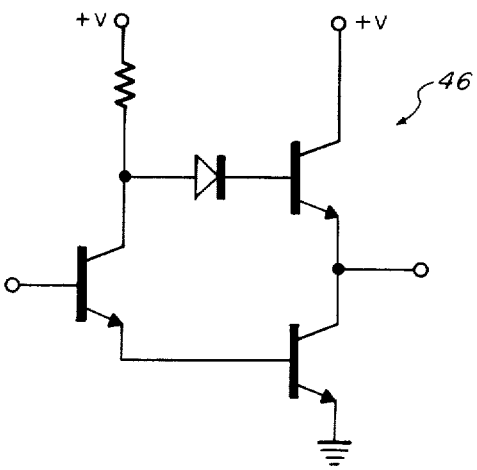

The outputs of the level detector 35 and the carrier detectors 38 and 42 are applied to a relay driver circuit 45. The relay driver circuit 45 is comprised of two identical single-ended open-loop amplifiers 46 and 47. The amplifier circuits 46 and 47 may be configured as illustrated in FIG. 6 for reasons similar to those described with respect to FIG. 3. The output of the level detector 35 is commonly applied as inputs to the amplifiers 46 and 47 via coupling capacitor 85 and resistors 50 and 51, respectively. The coupling means, not necessarily limited to a capacitor, provide the same catastrophic failure characteristics as have been previously described. The output of the carrier detector 38 is applied via a resistor 52 as an input to the amplifier 46 and the output of the carrier detector 42 is applied via a resistor 53 as an input to the amplifier 47. It will be appreciated that the amplifier 46 functions as a summing amplifier whose output depends on the sum of the voltages applied to the resistors 50 and 52. Similarly, the amplifier 47 output is the result of the sum of the voltages provided to the resistors 51 and 53.

Figure 7:
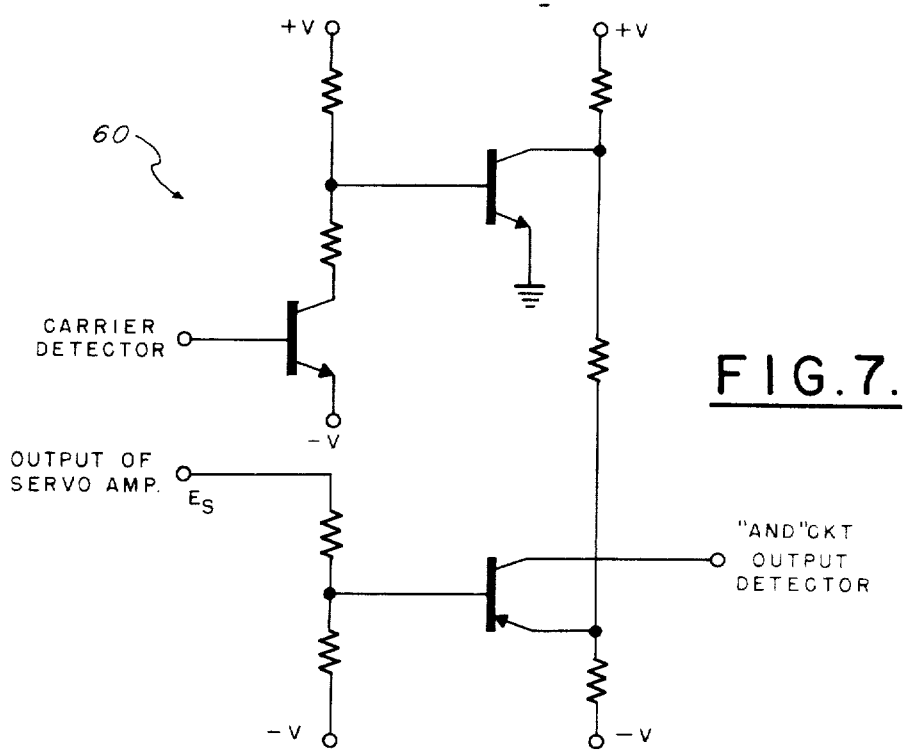

A servo level detector 60 is coupled between the carrier detector 42 and the amplifier 47. Additional AND circuits 60 may be connected in tandem to provide for monitoring of additional d.c. signals. In normal operation, the servo level detector 60 monitors the operation of the servo amplifier that drives the hydraulic system associated with the control surface to which the LVDT 11 is connected. The circuits utilized to implement the servo level detector 60 are illustrated in FIG. 7. In the servo level detector the output of the carrier detector 42 is added to a d.c. bias. Another d.c. bias is added to the output of the servo amplifier $E_S$. These two signals are connected to the base and emitter of a transistor switch respectively. When the servo output $E_S$ is less than 70 percent of its maximum value, the switch output $E_F'$ will be slaved to the output of the carrier detector 42.

The output of the amplifier 46 of the relay driver 45 is connected to the coil of a relay $K_1$ and to the coil of a relay $K_3$ through a diode 61. In a similar manner the output of the amplifier 47 is connected to the coil of a relay $K_4$ and through a diode 62 to the coil of a relay $K_2$. The coils of the relay $K_1$ and $K_2$ are connected in series and the coils of the relay $K_3$ and $K_4$ are similarly connected. A capacitor 63 is connected across the serially connected coils of the relays $K_1$ and $K_2$ and a capacitor 64 is connected across the serially connected coils of the relays $K_3$ and $K_4$. In order to pull in both pairs of relays each of the amplifiers 46 and 47 must alternately be OFF while the other is ON for a sufficient time to charge each of the shunt capacitors 63 and 64. Since the output of the level detector 35 is commonly connected to both the amplifiers 46 and 47, both amplifiers will turn ON and OFF simultaneously and no relay will pull in. The signals from the carrier detectors 38 and 42, however, alternately enable the amplifiers 46 and 47 to conduct in response to the signal from the level detector 35 allowing all the relays to pull in.

Associated with the relays $K_1$, $K_2$, $K_3$ and $K_4$ are single-pole, double-throw relay contacts 65, 66, 67 and 68 respectively. The relay contacts 65, 66, 67 and 68 are serially connected so that when all of the relays $K_1$ through $K_4$ are energized, a series circuit is completed. Should any one of the relays $K_1$ through $K_4$ drop out, the series circuit is broken. A source of potential is connected to the relay contact 65 and the relay contact 68 is connected through a delay relay 70 to the coil of a red light cutoff relay $K_5$. The other end of the coil of the relay $k_5$ is returned to ground.

A red warning light 71 is connected between a source of potential and the relay contacts 72 of the relay $K_5$. When the relay $K_5$ is deenergized, the red light circuit is completed to ground, thus turning on the light 71. When the relay $K_5$ is energized, the circuit is broken, hence turning off the light.

It will now be appreciated that, as previously mentioned, an open or a short anywhere in the T-networks 22, 26, 33 and 34 as well as a failure of any transistor or resistor in the signal paths associated therewith, will shift the d.c. reference out of range of the level detector 35. When this occurs the amplifiers 46 and 47 are no longer alternately conductive and all four relays $K_1$ through $K_4$ drop out. When this occurs the energization is removed from the relay $K_5$ causing the red warning light 71 to be illuminated. In a similar manner any open or short in the circuits associated with the carrier detectors 38 and 42 will shift the d.c. reference out of the range thereof and one pair of the relays $K_1$ through $K_4$ will drop out hence again illuminating the red warning light 71. It will now be appreciated that the pulses from the carrier detectors 38 and 42 serve to establish proper phasing and control of the relay driver circuit 45.

It should be noted that the delay relay 70 is included in the red light energizing path to prevent nuisance tripping of the monitor due to transients caused, for example, by gust or turbulence loading of the aircraft.

Figure 8:
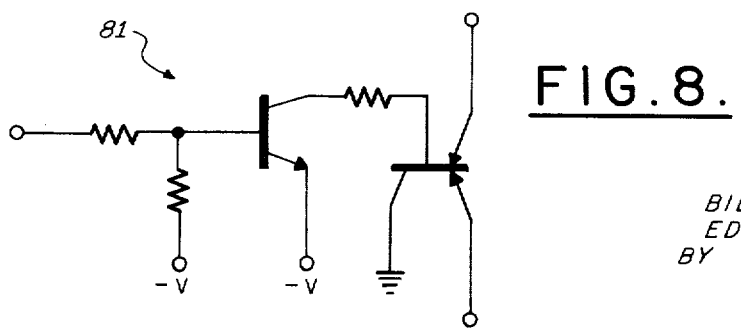

The monitor 10 also includes confidence test circuits 80 as well as two dual shunt switches 81 and 82. The dual shunt switches 81 and 82 may be configured in the manner illustrated in FIG. 8. The low side of the red warning lamp 71 is connected as an input to the confidence test circuit 80. The circuit 80 also receives as an input a confidence test start signal. The two outputs 83 and 84 of the confidence test circuit 80 are connected respectively to the dual shunt switches 81 and 82. In response to a signal on the lead 83 the dual shunt switch 81 connects the T-networks 26 and 34 to ground. In a similar manner, the dual shunt switch 82 connects the T-networks 22 and 33 to ground in response to a signal on the lead 84. The confidence test is performed to verify the operability of the relays $K_1$ through $K_5$ as well as the red light 71 and is performed just prior to landing in a manner to be described.

In normal operation when the signals from the LVDT's 11 and 15 are tracking one another and all of the components of the monitor 10 are operating properly, the alternately operating amplifiers 46 and 47 maintain the relays $K_1$ through $K_4$ energized thus maintaining the relay $K_5$ energized which in turn holds the red warning light 71 in its OFF condition. If, however, the signals from the LVDT's 11 and 15 should stop tracking, the negative half cycle sum of both LVDT's forces one of the full wave peak voltages, as illustrated in FIG. 2, below the threshold of the detector 35. This causes the output of the detector 35 to change to a near square wave at the carrier frequency. In the failure illustrated by the "LVDT's not tracking waveform" of FIG. 2, the positive portion of the $E_B$ waveform that is enabled by the $E_E$ waveform is no longer present and one pair of the relays $K_1$ through $K_5$ drops out, hence illuminating the red warning light 71 as previously described. The result is similar for a loss of carrier as illustrated by the "reduction of carrier level in one LVDT" waveforms of FIG. 2 except that the enabling voltage is missing instead of one-half of the $E_B$ waveform.

As previously discussed, should any component of the monitor 10 open or short, the red warning light 71 is illuminated. For example, should any resistor in any of the T-networks short or open, a d.c. unbalance will result with respect to the normally balanced d.c. tracer signals. When this occurs the d.c. reference is shifted out of the range of the associated detector and two or more of the relays $K_1$ through $K_4$ will drop out hence illuminating the red warning light 71. The circuit waveforms associated with this d.c. unbalance failure are illustrated in FIG. 2.

In accordance with the teachings of the present invention, most of the components of the monitor 10 are maintained in an alternating dynamic state when no failure is indicated. When any component stops alternating, the red failure light 71 is illuminated in the manner previously described. It may be appreciated, however, that the relays $K_1$ through $K_5$ as well as the red light 71 do not alternate and hence may not be failsafe. A confidence test is performed to verify the operability of these components, which test is ordinarily performed just prior to landing to verify that the entire monitor 10 is functioning properly during these critical landing maneuvers. The confidence test is performed in two parts. Initially, a signal is supplied to the confidence test start lead which energizes the dual shunt switch 82, hence grounding the T-networks 22 and 33. With these T-networks shorted the outputs of the comparator amplifiers 17 and 31 are biased to a point beyond the range of the level detector 35 and all of the relays $K_1$ through $K_4$ drop out. Logic circuits, not shown, may be utilized to verify that all four relays have indeed dropped out. The dropping out of the relays $K_1$ through $K_4$ causes the red light 71 to be illuminated via the operation of the relay $K_5$, thus verifying the operability of the red light. When the red light 71 turns on, the confidence test circuits 80 initiate the second part of the test by energizing the dual shunt switch 81 thus grounding the T-networks 26 and 34. With all of the T-networks 22, 26, 33 and 34 shorted, the LVDT signals are removed from the inputs to the comparator 16 and a balanced d.c. bias input to the comparator amplifiers 17 and 31 is restored. Under this condition, all of the relays $K_1$ through $K_4$ energize hence energizing the relay $K_5$, turning off the red light 71. When the red light 71 turns off, the confidence test circuit 80 deenergizes the dual shunt switches 81 and 82 returning the monitor 10 to normal operation.

It will be appreciated that the embodiment of the invention described above may be utilized in aircraft autopilot systems that require force limiting cam linkages. The LVDT 11 may be coupled to a control surface of the aircraft and LVDT 15 may be coupled to the hydraulic servo driving the surface, as previously mentioned, where the hydraulic servo drives the surface through a force limiting cam. When the surface driving force is below a predetermined level the cam remains in a detent and the LVDT's track one another. Under these conditions, no warning is indicated. When, however, the applied force exceeds the predetermined level, the cam comes out of detent, the LVDT's no longer track one another and a warning signal is provided to the pilot of the aircraft.

It is further appreciated that although the monitor 10 was described in terms of LVDT transducers, the principles of the present invention are equally adaptable to other transducer types. Furthermore, the invention was described in terms of use in an aircraft autopilot system. It will be appreciated, however, that the principles of the invention are adaptable to other types of systems.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for monitoring first and second signals for differences therebetween and detecting operability of components of said apparatus, the combination comprising a source of alternating reference potential, combining means for combining said first and second signals with said alternating reference potential in accordance with said differences between said first and second signals, means responsive to said combined signal for providing a first pulse signal in accordance therewith, means responsive to said first and second signals for providing second and third pulse signals respectively of different phases with respect to each other, first driver means responsive to said first and second pulse signals, second driver means responsive to said first and third pulse signals, said first and second driver means being alternately energized with respect to each other whenever the difference between said first and second signals is less than a predetermined threshold and said components of said apparatus are functioning properly, and output means coupled to said first and second driver means for being maintained in an energized condition whenever said first and second driver means are alternately energized with respect to each other and for being deenergized whenever said first and second driver means cease being alternately energized with respect to each other, thereby providing a warning signal.

2. The apparatus of claim 1 in which said combining means further includes resistor T-network means for coupling said first and second signals to said combining means, and d.c. tracer voltage sources coupled to said resistor T-network means for providing signals to disrupt said alternate energization of said first and second driver means when a component of the signal paths of said apparatus fails.

3. The apparatus of claim 2 further including testing means for systematically interrupting said first and second signals to systematically operate said output means thereby verifying the operability thereof.

4. The apparatus of claim 1 in which said first and second signals comprise first and second variable amplitude carrier signals, said alternating reference potential comprises a full wave rectified sinusoidal signal and said combining means comprises means for obtaining the difference between said first and second signals, and means for adding said difference to said alternating reference potential thereby providing said combined signal.

5. The apparatus of claim 1 further including a source of d.c. reference potential, and means for adding said d.c. reference potential to said alternating reference potential.

6. The apparatus of claim 4 in which said means responsive to said combined signal comprises first level detecting means for providing first and second output levels whenever said combined signal exceeds and does not exceed a predetermined threshold, respectively, thereby providing said first pulse signal of such a character that under proper operation one pulse is provided for each cycle of said full wave rectified sinusoidal signal.

7. The apparatus of claim 6 in which said means responsive to said first and second signals comprises second level detecting means responsive to said first carrier signal for providing first and second output levels whenever said first carrier signal exceeds and does not exceed a predetermined threshold, respectively, thereby providing said second pulse signal of such a character that under proper operation, one pulse is provided for each cycle of said first carrier signal, and third level detecting means responsive to said second carrier signal, of different phase with respect to said first carrier signal, for providing first and second output levels whenever said second carrier signal exceeds and does not exceed a predetermined threshold, respectively, thereby providing said third pulse signal of such a character that under proper operation one pulse is provided for each cycle of said second carrier signal.

8. The apparatus of claim 7 in which said first driver means includes means for testing coincidence between said pulses of said first and second pulse signals and energizing said first driver means only upon said coincidence thereof, and said second driver means includes means for testing coincidence between said pulses of said first and third pulse signals and energizing said second driver means only upon said coincidence thereof.

9. The apparatus of claim 1 in which said output means comprises first relay switch means having first relay energizing means and first contact means, second relay switch means having second relay energizing means and second contact means, first unidirectional charging circuit means coupled with said first relay energizing means, and second unidirectional charging circuit means coupled with said second relay energizing means, said first and second unidirectional charging circuit means being connected in parallel between the outputs of said first and second driver means, said first and second contact means being connected in series circuit with respect to each other to provide said warning signal whenever said first and second driver means cease being alternately energized thereby permitting said contact means to break said series circuit.

* * * * *